United States Patent
Fair et al.

(10) Patent No.: US 7,996,445 B2
(45) Date of Patent: Aug. 9, 2011

(54) BLOCK REALLOCATION PLANNING DURING READ-AHEAD PROCESSING

(75) Inventors: Robert L. Fair, Cary, NC (US); Robert M. English, Menlo Park, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 658 days.

(21) Appl. No.: 11/741,662

(22) Filed: Apr. 27, 2007

(65) Prior Publication Data

US 2008/0270706 A1 Oct. 30, 2008

(51) Int. Cl.
*G06F 13/00* (2006.01)
(52) U.S. Cl. ........ 707/813; 707/821; 711/170; 711/137; 711/158; 712/207
(58) Field of Classification Search .......... 711/137, 711/158, 170; 712/207; 707/813, 821
See application file for complete search history.

(56) References Cited

U.S. PATENT DOCUMENTS

| | | | |
|---|---|---|---|
| 6,434,663 B1 * | 8/2002 | Grimsrud et al. | 711/111 |
| 6,463,509 B1 * | 10/2002 | Teoman et al. | 711/137 |
| 6,633,968 B2 | 10/2003 | Zwiegincew et al. | |
| 7,536,505 B2 * | 5/2009 | Takakuwa | 711/114 |
| 2002/0002658 A1 | 1/2002 | Okayasu | |
| 2004/0049367 A1 * | 3/2004 | Kurosawa et al. | 702/188 |
| 2005/0050279 A1 | 3/2005 | Chiu et al. | |

OTHER PUBLICATIONS

Anh, et al., "DFS: A De-fragmented File System", Proceedings of the 106th IEEE Int'l Symp. On Modeling, Analysis & Simulation of Computer & Telecommunications Systems, XP010624418, Oct. 11, 2002, pp. 71-80.

Zhiyuan Li et al ., "Configuration prefetching techniques for partial reconfigurable coprocessor with relocation and defragmentation", International Symp. On Field Programmable Gate Arrays, XP-002349321, Feb. 1, 2002, pp. 187-195.

DIRMS "Buzzsaw—On-the-Fly Defragmentation," Defragmentation Programs for Windows XP, 2000, & NT, found at www.dirms.com, retrieved on Mar. 8, 2007, 1 page.

DIRMS "DirMS" Defragmentation Programs for Windows XP, 2000, & NT, found at www.dirms.com, retrieved on Mar. 8, 2007, 1 page.

Singh, Amit "Fragmentation in HFS Plus Volumes," 1994-2006, found at www.kernelthread.com, 11 pages.

* cited by examiner

*Primary Examiner* — Hong Kim
(74) *Attorney, Agent, or Firm* — Blakely, Sokoloff, Taylor & Zafman LLP

(57) ABSTRACT

A data storage system pre-fetches data blocks from a mass storage device, then determines whether reallocation of the pre-fetched blocks would improve access to them. If access would be improved, the pre-fetched blocks are written to different areas of the mass storage device. Several different implementations of such data storage systems are described.

22 Claims, 11 Drawing Sheets

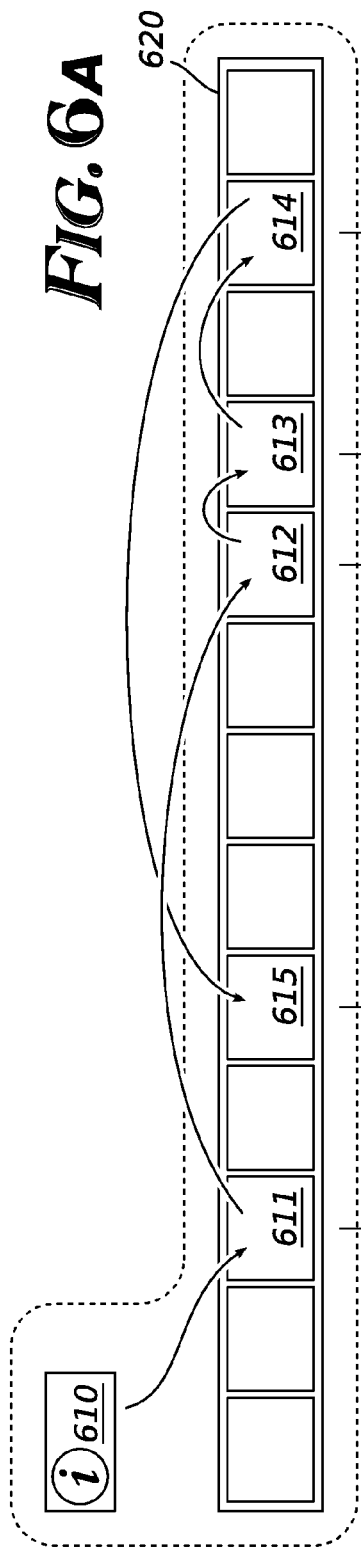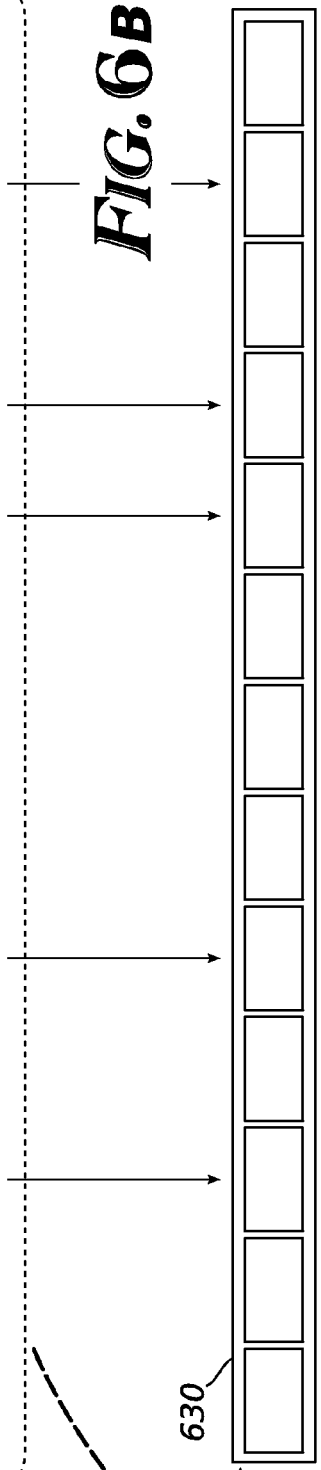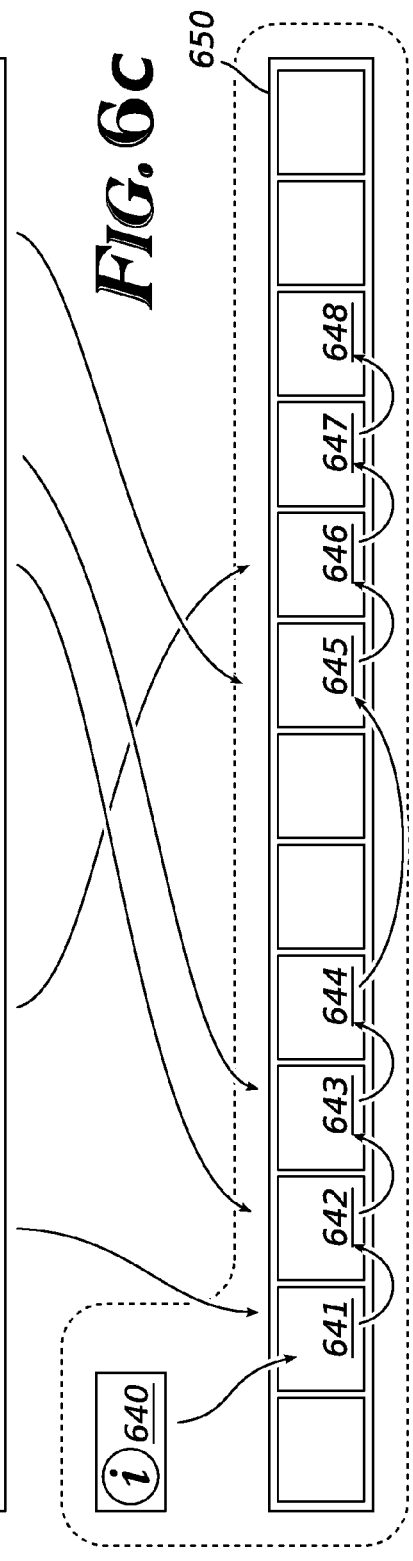

BLOCK REALLOCATION PLANNING DURING READ-AHEAD PROCESSING

FIELD

The invention relates to data storage operations. More specifically, the invention relates to low-computational-cost methods for detecting and reducing fragmentation in objects stored on a mass storage device.

BACKGROUND

Many contemporary data processing systems consume and/or produce vast quantities of data. Electromechanical devices such as hard disk drives are often used to store this data during processing or for later review. The mechanical nature of many types of mass storage devices limits their speed to a fraction of the system's potential processing speed, so measures must be taken to ameliorate the effects of slow storage.

Mass storage devices are commonly viewed as providing a series of addressable locations in which data can be stored. Some devices (such as tape drives) permit storage locations to be accessed in sequential order, while other devices (such as hard disks) permit random access. Each addressable storage location can usually hold several data bytes; such a location is called a "block." Common block sizes are 512 bytes, 1024 bytes and 4096 bytes, though other sizes may also be encountered. A "mass storage device" may be constructed from a number of individual devices operated together to give the impression of a single device with certain desirable characteristics. For example, a Redundant Array of Independent Disks ("RAID array") may contain two or more hard disks with data spread among them to obtain increased transfer speed, improved fault tolerance or simply increased storage capacity. The placement of data (and calculation and storage of error detection and correction information) on various devices in a RAID array may be managed by hardware and/or software.

Occasionally, the entire capacity of a storage device is dedicated to holding a single data object, but more often a set of interrelated data structures called a "filesystem" is used to divide the storage available among a plurality of data files. Filesystems usually provide a hierarchical directory structure to organize the files on the storage device. Note that a file in a filesystem is basically a sequence of stored bytes, so it can be treated identically to a mass storage device for many purposes. For example, a second filesystem can be created in a file on a first filesystem. The second filesystem can be used to divide the storage space of the file among a plurality of data files, all of which reside within the file on the first filesystem. Such nested filesystems can be constructed to an arbitrary depth, although depths exceeding one or two levels are not particularly useful. A file that contains a nested filesystem is called a "container file."

The logic and procedures used to maintain a filesystem (including its files and directories) within storage provided by an underlying mass storage device or container file can have a profound effect on data storage operation speed. This, in turn, can affect the speed of processing operations that read and write data in files. Thus, filesystem optimizations can improve overall system performance.

Read reallocation is a technique that can improve a storage system's performance on large sequential reads. When a read request calls for many data blocks to be copied from a mass storage device into system memory, the read may proceed faster if the data blocks are located physically near one another and/or in sequential order on the storage device. Prior-art systems recognize the benefit of read reallocation, under the rubric of file defragmentation. FIG. 2A shows how data blocks 210-240 may be arranged on a storage device 200. Blocks labeled 210 are unused, while blocks 220, 230, 240 and 250 contain data in a file. When the data blocks of a file are separated and/or stored out-of-order, as shown in FIG. 2A, the file is said to be "fragmented." A process that reads the file might cause the storage system to perform four separate read operations to obtain the contents of data blocks 220-250. However, if the file is defragmented by moving the contents of data blocks 220-250 around as shown in FIG. 2B, all the data blocks might be obtained in a single read operation. Even partial defragmentation, shown in FIG. 2C, may provide some benefit. Unfortunately, file defragmentation is a time-consuming process, as blocks must be located, read into memory, and then stored in more nearly sequential locations. If the storage device has little free capacity, it may be necessary to move many blocks from place to place to coalesce free areas. Furthermore, files that change or grow tend to become increasingly fragmented over time, necessitating repeated defragmentation operations.

Techniques to reduce fragmentation without explicit, time-consuming defragmentation cycles, may be useful in improving storage operations.

SUMMARY

A mass storage device access optimizer uses information collected when data blocks are pre-fetched from storage to decide whether to reallocate some or all of the data blocks for improved access.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIGS. 6A, 6B, and 6C show nested filesystems can hide fragmentation from logic that operates at only one level.

FIGS. 10A, 10B and 10C show how a file may become fragmented during operations, and how an embodiment can reallocate portions of the file to improve access.

DETAILED DESCRIPTION

When a storage client requests data that is stored on a mass storage device of a storage server, filesystem management logic at the server may read extra data blocks that have not yet been requested by the client. Reading these extra blocks ("speculative reading" or "read-ahead") may save time if the client later requests the pre-fetched data. However, even if the client does not request the pre-fetched data, the filesystem logic has already spent the processing time required to locate the read-ahead data blocks on the storage device, and the input/output ("I/O") cost to read the data into memory. Thus, information about fragmentation in the data blocks is available, and part of the cost of defragmenting the blocks (that of finding and loading the blocks into memory) has already been borne. Instead of simply discarding the read-ahead data if it is not used, if the blocks were fragmented, an embodiment of the invention can mark the data for re-writing in a less-fragmented location. This process can salvage some value from an erroneous read-ahead prediction (otherwise, the computational and I/O costs would simply appear to users as system "slowness," without the offsetting benefit of faster future access). Of course, if the read-ahead prediction is correct, then embodiments of the invention get two wins for the price of one: the correctly-predicted successive reads proceed faster, and subsequent reads may be faster as well.

Figure 1:
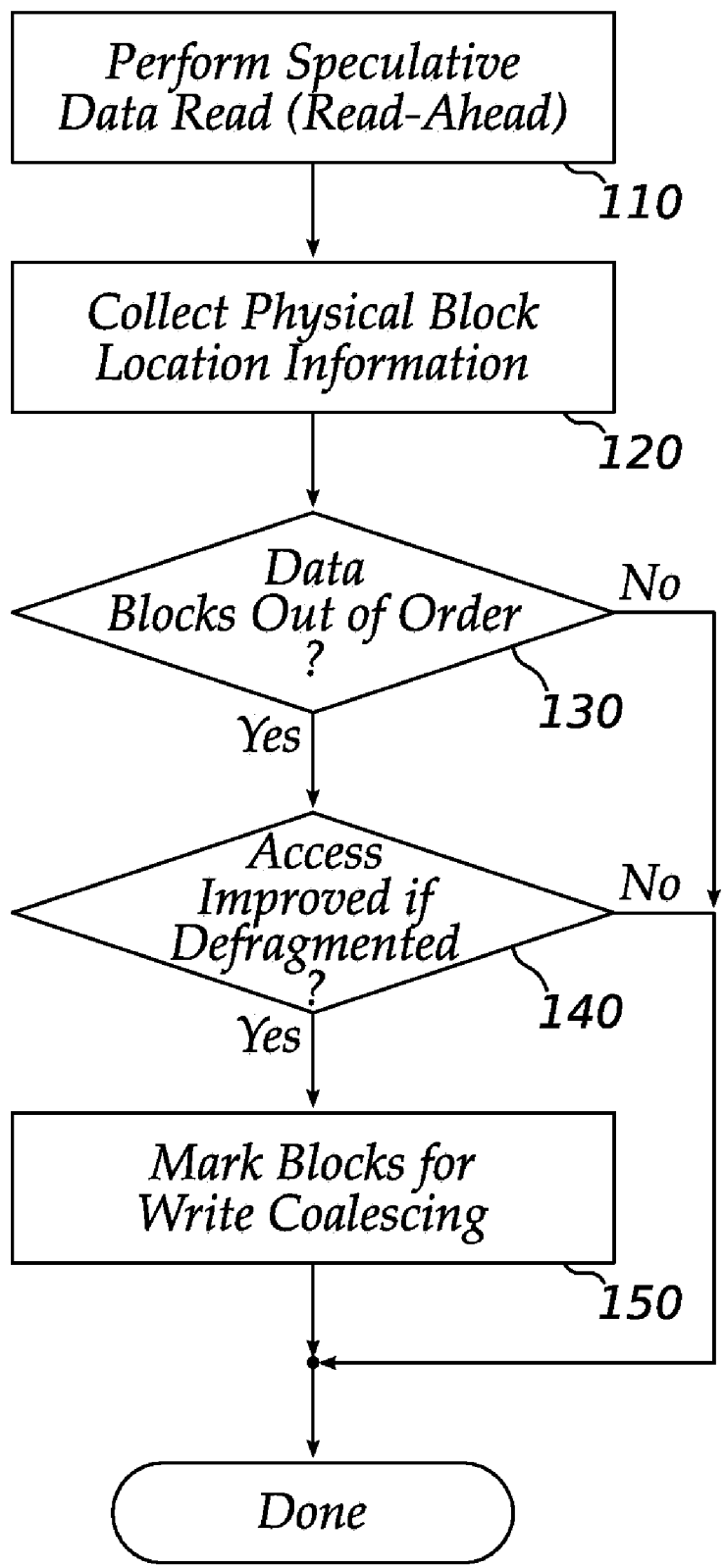
FIG. 1 is a flow chart showing operations of an embodiment of the invention.
Figure 2A:
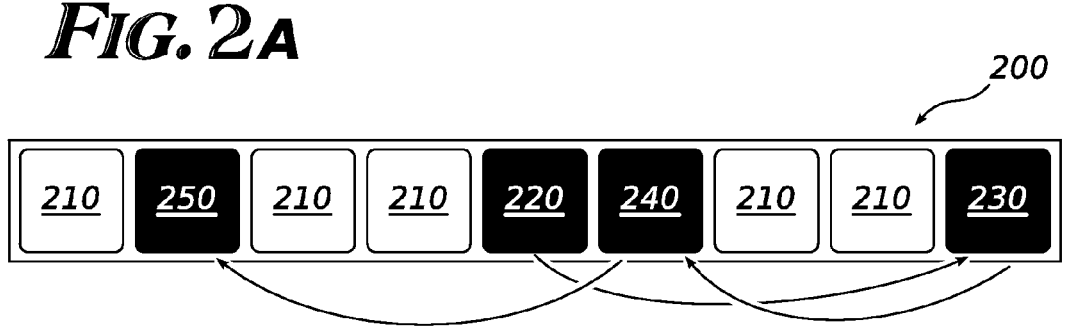
FIG. 2A shows how blocks of a fragmented file may be stored on a mass storage device.
Figure 2B:
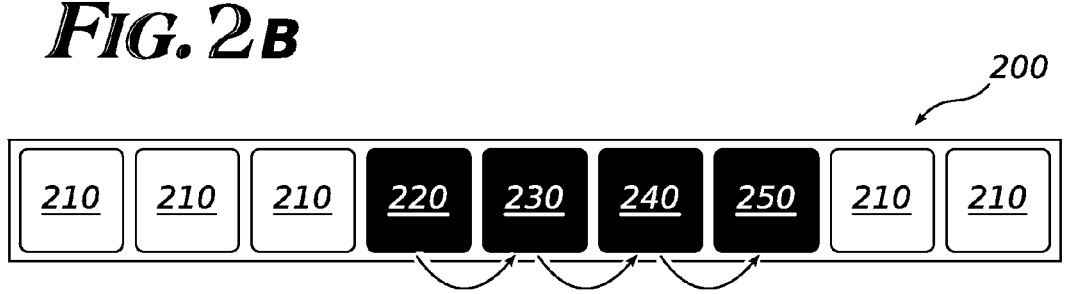
FIGS. 2B and 2C show how blocks of a file may be stored after defragmentation.
Figure 2C:
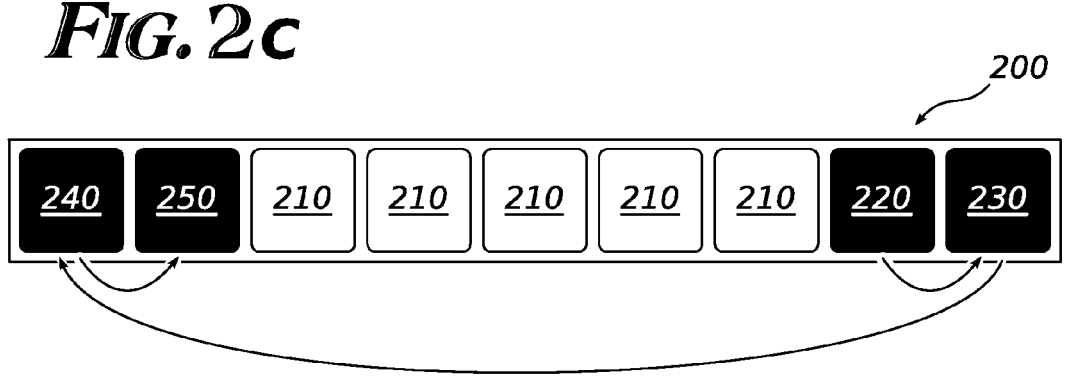

FIG. 1 provides an outline of a process according to an embodiment of the invention. First, a speculative read-ahead is performed (110) to load data blocks of a file into memory in advance of a (predicted) client's request to read those blocks. Physical block location information is collected in connection with the speculative read-ahead (120). If the data blocks are out of order (130) and if access to the file would be improved if the blocks were moved and/or re-ordered (140), the blocks are marked for later write coalescing (150). If the blocks are already in order or access to the file is not expected to be much improved, no special marking or processing is done.

Embodiments of the invention can be used in almost any system that stores and retrieves data on a mass storage device (or a storage subsystem) in accordance with space management information maintained in a filesystem. However, certain environments are particularly dependent upon storage system performance, and may consequently derive particular benefit from the techniques described herein. Some of these environments are described here in greater detail. It is appreciated that filesystem operations are quite complex, and a concrete implementation may differ from the systems described here in many respects. However, the principles underlying embodiments of the invention will be clear to those of ordinary skill in the relevant arts, and can be adapted to fit most implementations.

Figure 3:
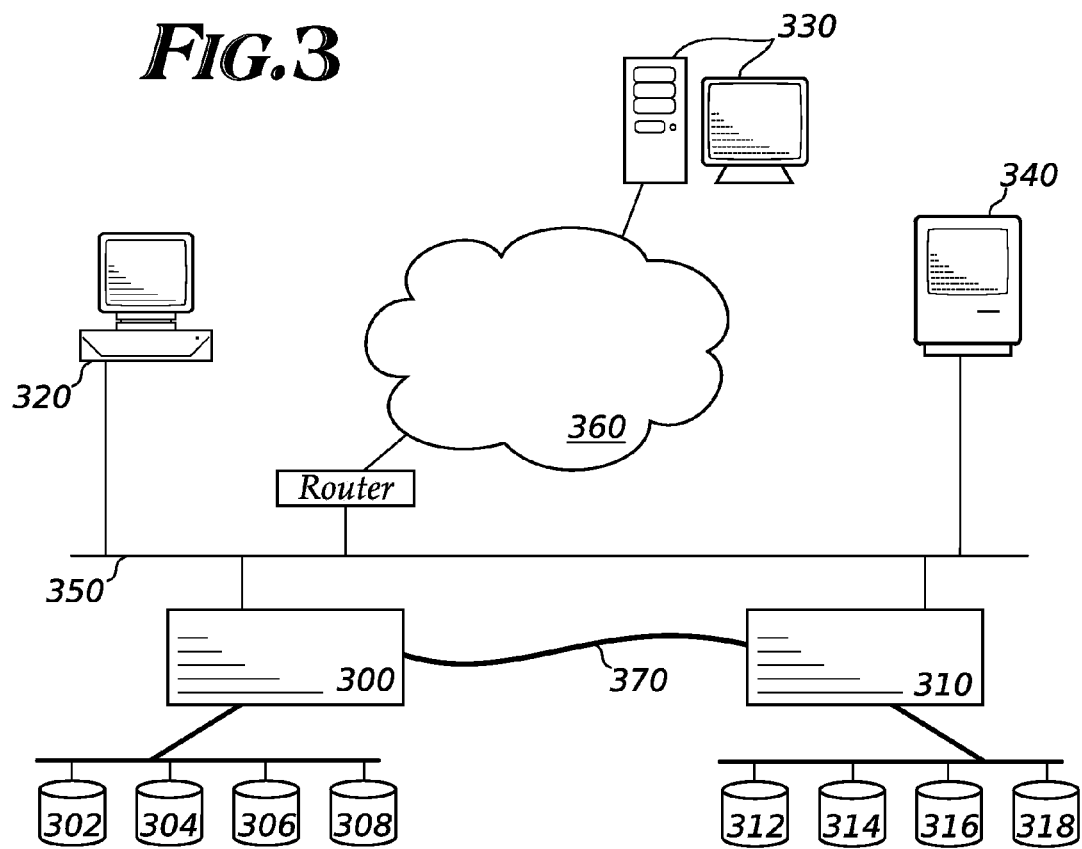
FIG. 3 shows an environment where an embodiment of the invention is used.

FIG. 3 shows an environment where an embodiment of the invention operates. Two network-accessible storage servers 300 and 310 provide data storage services to clients 320, 330 and 340. Clients transmit requests to read or write data, or to perform other file-related operations (e.g. create, rename or delete files or directories) over a network such as local area network ("LAN") 350 or distributed data network 360, and receive responses from the server. Servers 300 and 310 store data on mass storage devices 302-308 and 312-318 (respectively); these devices may be operated as Redundant Arrays of Independent Disks ("RAID arrays") by software and/or hardware in the servers. Servers 300 and 310 may have a dedicated communication channel 370 through which they can exchange data and control information, as described below. This arrangement may be useful if, for example, server 310 is configured to operate as a mirror of server 300 (i.e. to maintain an identical copy of some of the data stored on server 300).

Figure 4:
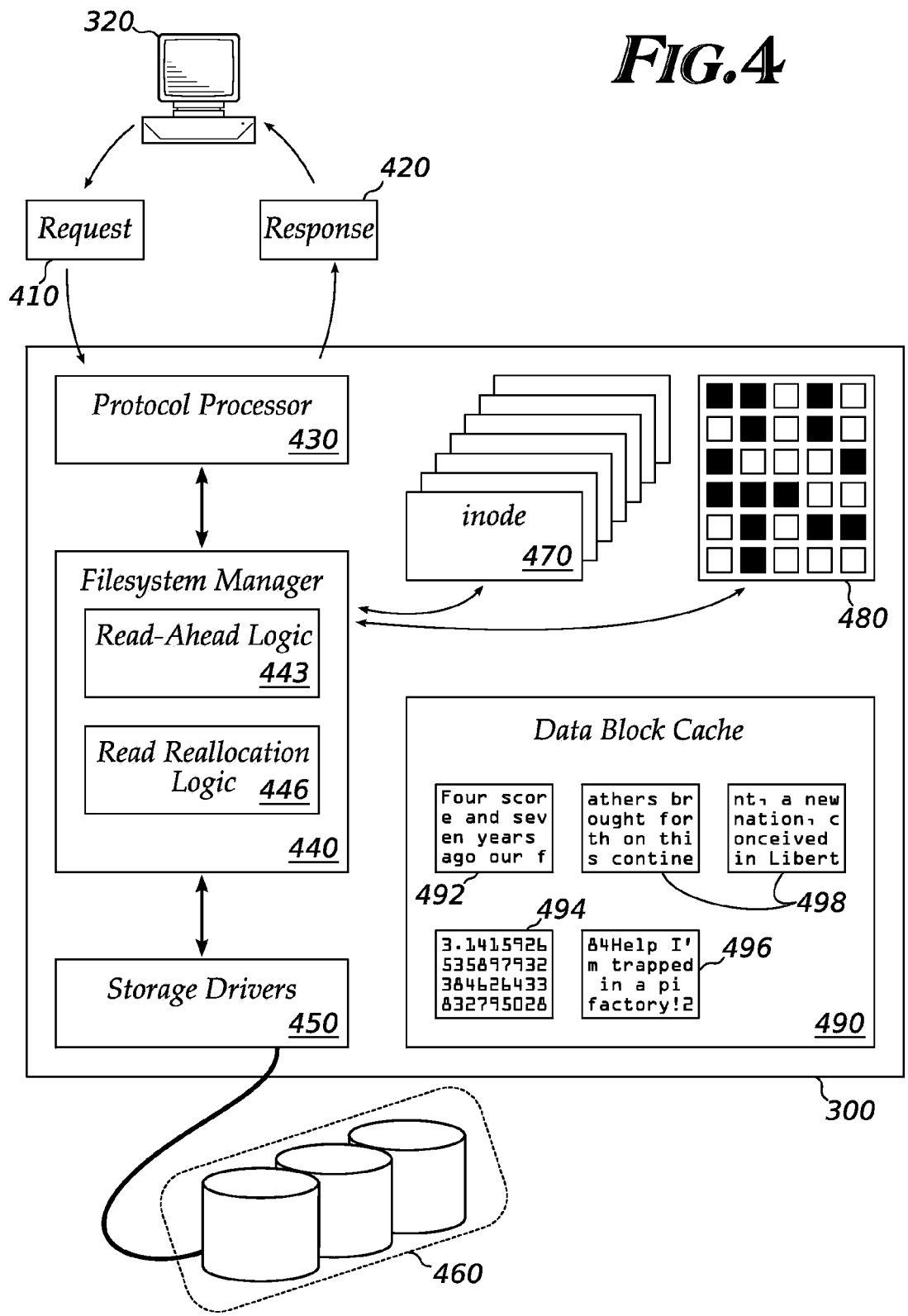
FIG. 4 shows some internal details of a system that implements an embodiment of the invention.

FIG. 4 shows server 300 in greater detail. Client 320 transmits a request 410 to storage server 300 and receives a response 420 in return. Internally, server 300 may include subsystems such as protocol processor 430, to receive and interpret requests from clients and to prepare correctly-structured responses. Protocol processor 430 may permit server 300 to interact with clients according to several different protocols. For example, storage server 300 may be able to accept and respond to requests according to the Network File Service ("NFS") protocol, the Common Internet File Service ("CIFS") protocol, the Fibre Channel Protocol ("FCP") or the iSCSI protocol. (The iSCSI protocol is an adaptation of the Small Computer Systems Interface ("SCSI") protocol that uses data packets transmitted via the Transmission Control Protocol ("TCP") and Internet Protocol ("IP;" together, commonly "TCP/IP")). NFS and CIFS are file-oriented protocols, while FCP and iSCSI are block-oriented protocols.

After protocol processing, a client's request may be forwarded to a filesystem manager 440, which administers the storage space available from server 300 and ensures that data can be reliably stored and retrieved. Filesystem manager 440 interacts with storage drivers 450 to read or write data on mass storage devices 460, which may be operated as a RAID array. Filesystem managers that can benefit from an embodiment of the invention are found in several commercially-available storage server systems, including the Data ONTAP family of products from Network Appliance, Inc. of Sunnyvale, Calif., which implement the Write Anywhere File Layout ("WAFL") filesystem. Filesystem managers that implement copy-on-write and write-in-place filesystems can also use embodiments of the invention.

Filesystem manager 440 maintains various data structures to perform its duties. Most filesystems maintain at least two main types of information: inodes 470 and a block map 480. Specific filesystem implementations may divide the information up differently, and may keep many other ancillary data structures as well, but will generally have data with semantics similar to inodes 470 and block map 480, described below. For the purposes of understanding embodiments of the invention, an inode is a data structure that contains (or leads to) information to identify a sequence of data blocks that contain data in a file or other object. A block map is a data structure that indicates, for each data block of a plurality of blocks, whether the block is in use or is free.

Many filesystem managers maintain a data block cache 490 containing copies of data from mass storage devices 460, but stored in a memory that can be accessed faster than the electromechanical devices. Cache 490 may contain copies of data blocks that were recently requested by a client (492, 494), copies of data blocks that have been modified by a client but not yet written back to a storage device (496), and—of relevance to embodiments of the invention—data blocks 498 that have not been requested by a client, but that read-ahead logic 443 has determined are likely to be requested in the future.

Read-ahead logic 443, which may be implemented as software, firmware, hardware (e.g., an Application Specific Integrated Circuit or "ASIC," or a Field-Programmable Gate Array, "FPGA") or a combination of these, may monitor clients' access patterns and other information to decide when reading more data than is strictly required to fulfill pending requests may be beneficial. For example, if a client has recently requested several successive portions of a file, read-ahead logic 443 may predict that the client will request more data from the file, and proactively load that data into cache 490. Pre-fetched or read-ahead data is different from other data read from a mass storage device, although the procedures and subsystems used to get the data from a mass storage device into memory are usually the same. The difference is that no client has yet requested the pre-fetched data, the data may never be used, and no client or process is waiting for it when the decision to load it is made. A system may pre-fetch data when it anticipates that the data will be useful (i.e., that a client will ask for the data, or that the system will need to refer to the data to fulfill a client's request). If the system's prediction is correct, the data will be ready to send to a client that requests it. If the prediction is wrong, the system will have done extra work that turned out to be unnecessary. A system may pre-fetch data that it expects a client will request, and may also pre-fetch other data that it will use internally to fulfill a client's expected request. For example, if read-ahead logic 443 predicts that a client will open a file in a directory, blocks containing inode data and directory data may be pre-fetched in anticipation of the open request. This data may not be returned to the client, but may be used in performing the client's request (if the expected request actually occurs). If the predictions of read-ahead logic 443 are often wrong over a period of time, a different prediction algorithm may be tried, or read-ahead logic may be turned off temporarily, since the system's current workload does not seem to be predictable.

As discussed in greater detail below, logic in the storage server must locate the mass storage device blocks that contain the read-ahead data so that it can be loaded, so information about the blocks' absolute location, and location relative to other blocks, is available to an embodiment of the invention if a read-ahead is performed. A block's absolute location is its address or index relative to a known point. For example, a physical mass storage device usually enumerates blocks sequentially from the start of the device, starting at zero and continuing to the last block. A file can be seen as a sequence of data bytes, so the absolute location of a block within a file may be the offset within the file of the bytes that make up the data block.

This information is used by read reallocation logic 446 to identify blocks that are out of sequence, are located far from other related blocks, or are otherwise disposed on the mass storage device in a way that impairs their efficient retrieval. (An example of blocks that may be difficult to retrieve efficiently is presented below in connection with FIG. 10.) When such blocks are identified, they may be marked for further processing. For example, the blocks (which have been loaded into data block cache 490 as a result of the prediction of read-ahead logic 443) may be written out together to a different, contiguous portion of the mass storage device(s). The next time this data is accessed, the system may be able to load it faster.

Figure 5:
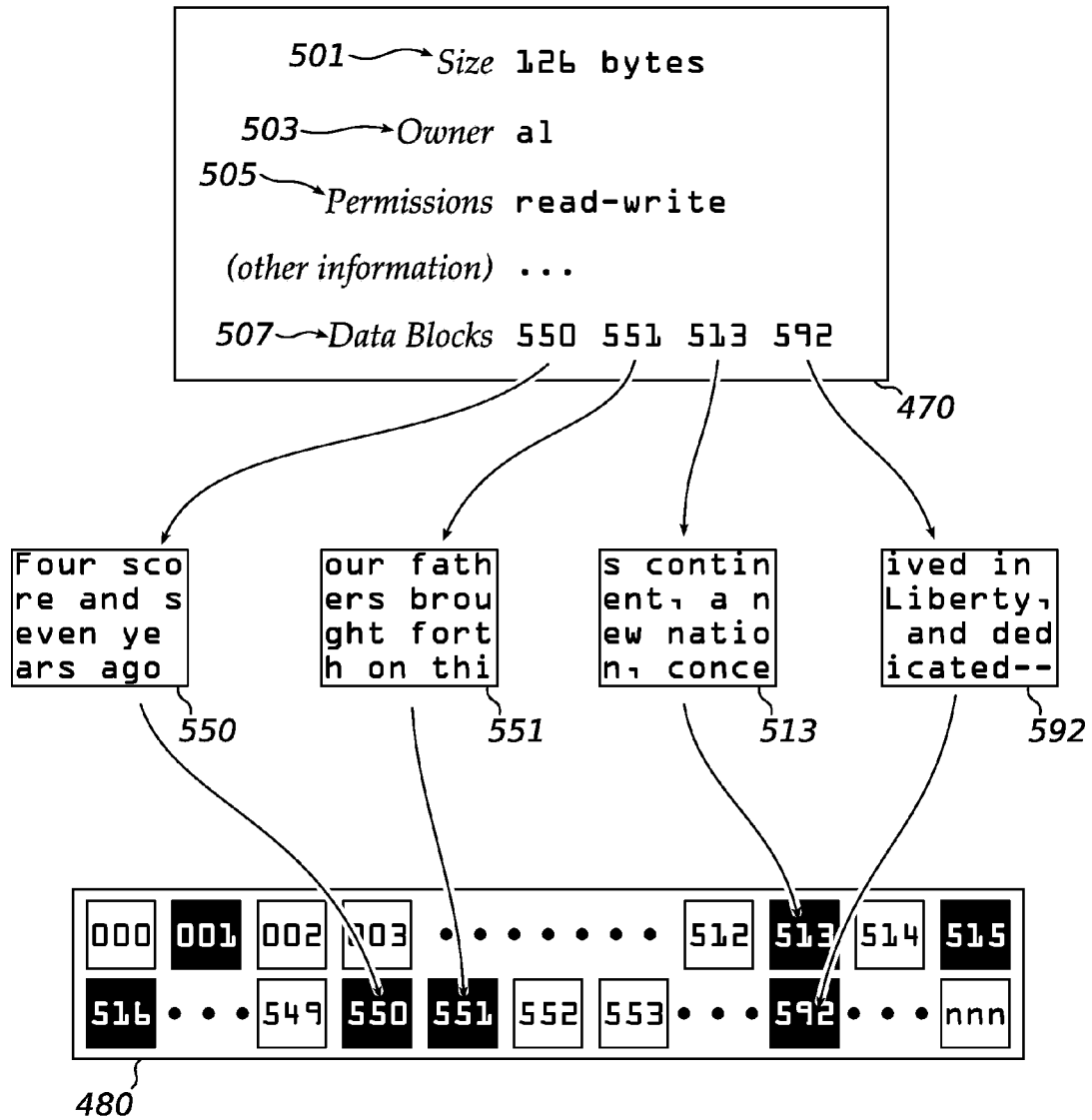
FIG. 5 explains some data structures that are used in many filesystems.

FIG. 5 illustrates the relationships between data structures maintained by a filesystem manager and the underlying data of a file. Inode 470 contains several pieces of metadata about a file: its size 501, owner 503, and access permissions 505, among other things (not shown). Inode 470 also contains data block numbers 507, which can be used to retrieve the file's data from its underlying mass storage device. (Inodes are usually of fixed size, so the indices of all the data blocks in a large file may not fit into the inode. In this case, the inode may contain pointers to data blocks called "indirect blocks," which contain the indices of data blocks containing the file's data.)

Note that inode 470 does not contain a name for the file. Instead, filesystems typically store the file's name and a pointer to its inode in a directory, which can be thought of as (and often is) simply a specially-formatted file containing a list of names and pointers to associated inodes. The example inode 470 shown in FIG. 5 describes a 126-byte file whose data resides in data blocks 550, 551, 513 and 592 (in that order). (Note that in a practical implementation, a 126-byte file would probably not occupy four blocks, since blocks are usually at least 512 bytes long. This example uses 32-byte blocks so that the contents of the blocks can be shown legibly in the figure and recognized as sequentially related—the blocks contain part of the opening sentence of a famous speech. It is appreciated that embodiments of the invention can be used with any block size.)

Block map 480 is a second data structure that indicates which data blocks of the underlying mass storage device are in use. It is appreciated that the data in block map is redundant, in the sense that it could be recreated by examining all the inodes to find in-use blocks. However, filesystems usually maintain block maps for improved efficiency and fault detection/recovery.

FIG. 6A shows an inode 610 that identifies a series of blocks of a file 611-615. The blocks are located at various non-sequential offsets within a filesystem 620. However, as mentioned in [0004], filesystem 620 may be constructed in a file 630, shown in FIG. 6B. (File 630 is a "container file.") For simplicity, the blocks 611-615 of the file described by inode 610 are depicted occupying identical positions within file 630 as they do within filesystem 620. Continuing now to FIG. 6C, file 630 is stored within a lower-level file system 650 and described there by inode 640. The blocks 641-648 that store the data of file 630 may be arranged in a different order than is apparent from the block indices contained in inode 610. Upon examining the block numbers listed in inode 610, one might expect the corresponding file to be heavily fragmented and slow to access, but the data for that file is actually stored mostly sequentially in filesystem 650. If the blocks of filesystem 650 were actually located directly on a mass storage device (rather than in a yet-lower-level container file), the file associated with inode 610 would be likely to have relatively good access speed. As a corollary, note that if the file associated with inode 610 was "defragmented" within its filesystem 620, it is entirely possible that access to the file would be impaired because blocks that are in sequential order with respect to filesystem 620 may be out of order with respect to the underlying filesystem 650.

Figure 7:
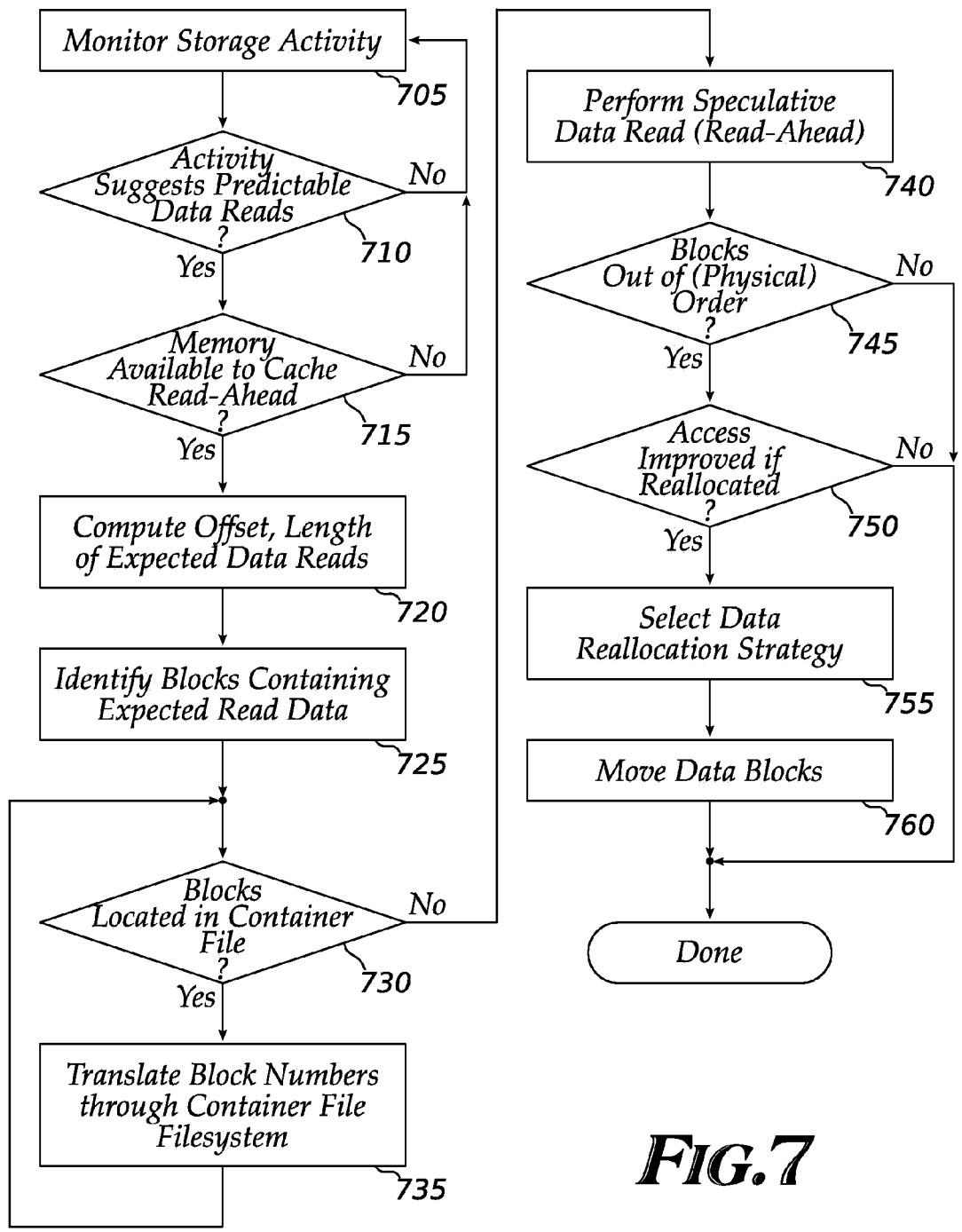
FIG. 7 is a flow chart that provides greater detail of operations of an embodiment of the invention.

In light of the foregoing material, the method described in the flow chart of FIG. 1 will now be described in greater detail. Turning to FIG. 7, a system implementing an embodiment of the invention monitors its storage activity (705). Storage activity includes the read and write operations the system performs to load data from, or store data on, its mass storage devices. This activity may be initiated in response to a client request, or it may be generated through the system's own internal operations. (For example, a system may perform a periodic filesystem consistency check and grooming.) Monitoring can be performed by historical analysis logic in a filesystem manager that tracks client requests, internal storage server activity in response to client requests, and other metrics.

If the storage activity suggests that reasonably accurate predictions of future read operations can be made (710), and if adequate cache memory to hold read-ahead data is available (715), the system computes the offset(s) and length(s) of expected reads (720). Here, "reasonably accurate" and "adequate cache memory" imply tunable parameters. If, for example, system I/O activity is moderate and cache usage is low, the system may decide to risk pre-fetching data that is not particularly likely to be needed. On the other hand, if the system is already busy performing I/O or the cache is nearly full, only data that is fairly certain to be requested soon may be speculatively read. Predicting future reads may take into account information about the number of active clients and the type of access the clients are using. Prediction logic may take into account the correctness of recent predictions—if many recent corrections are correct, then it is likely that the storage server's current workload is similar to a model workload on which the predictions are based. On the other hand, if many recent predictions are incorrect, the system may pre-fetch fewer blocks (or cease pre-fetch activity altogether) until the workload changes to something that is more predictable.

Throughout this description, "predicting" has been used in its colloquial sense of "declaring in advance" or "making an inference regarding a future event based on probability theory," (Webster's Third New International Dictionary). "Predicting" problems arise in many important disciplines such as signal analysis and data compression, and a great deal is known about designing algorithms to predict the behavior of systems based on limited or incomplete information. Since these techniques are known and competently described elsewhere, they are not discussed here. An implementer of an embodiment of the invention may wish to investigate techniques such as Prediction by Partial Matching ("PPM"), lossless encoding algorithms, and the Efficient Universal Prediction Algorithm described by Jacob Ziv in his eponymous 2002 paper. It is appreciated that future advancements in prediction theory are likely to be such that one of ordinary skill can incorporate the new techniques into an embodiment without undue experimentation.

After predictions are made about future reads, filesystem logic refers to various data structures (including, for example, those described with reference to FIG. 5), and determines which blocks contain the data that is expected to be read (725). This determination is made in the usual way; the difference is that the blocks to be located are chosen based on a predictive process, rather than in response to a client's request or other direct process. If these blocks are located in a container file (i.e. the blocks are stored in a file that is maintained within a lower-level filesystem, rather than directly on an underlying mass storage device) (730), the block numbers are translated through data structures describing the container file within the lower-level filesystem (735). As mentioned earlier, filesystems may be nested to an arbitrary depth, but nestings deeper than one or two levels are of limited usefulness. Translations (possibly repeated) as described here will convert a block number within a container file, or a "virtual volume block number" ("VVBN"), into a block number on a physical mass storage device, or a "physical volume block number" ("PVBN"). The layers of indirection provided by these virtual-to-physical translations permit several useful operational arrangements, discussed presently. It is appreciated that the specific VVBN-to-PVBN translation described here may be inefficient and time-consuming; a practical system may implement an alternate arrangement, such as storing both VVBNs and PVBNs in an indirect block referenced from the inode, which may provide better performance. This optimization may be used in an embodiment of the invention; and it should be appreciated that the system only needs a physical volume block number to perform a read operation on the mass storage device.

Eventually, an embodiment will have a set of PVBNs that can be used to read data blocks from a mass storage device. These blocks are read into cache memory (740). The PVBNs also indicate whether (and to what extent) the data blocks are fragmented on the underlying storage device. If the blocks are out of (physical) order (or are non-contiguous or otherwise time-consuming to read) (745), and if access to the blocks could be improved by rearranging them on the storage device (750), an embodiment selects a data reallocation strategy to perform the rearrangement (755) and then moves the data blocks (760). If the blocks are (nearly) in order, or if access is unlikely to be improved, no rearrangement is attempted. In some embodiments, the final operation (moving the data blocks) may be omitted. Merely collecting information about the fragmentation state of files and data objects on a mass storage device may be useful to guide information technology managers' decisions relating to performing backups, adding storage, and so on.

Block rearrangement strategies, like most defragmentation techniques, involve moving data from one place on the mass storage device to another. Clearly, this requires both a read operation and a write operation. However, the read operation has already been performed as part of the speculative pre-fetch, so only the cost of the write operation remains. Furthermore, since the read operation was performed with the expectation that the data would soon be requested by a client, it is (on average) less costly than an arbitrary read that is only part of a defragmentation process. In addition, collecting and (possibly) acting on fragmentation information as described here permits the system to extract value from mistaken prefetch predictions. That is, even if the speculatively-read data is not requested by a client, the computational cycles and I/O bandwidth consumed to read it are not completely wasted. Instead, the system has an opportunity to improve the layout of data blocks on the mass storage device.

It should be appreciated that data blocks need not be stored strictly sequentially or contiguously on a mass storage device. For example, a sequence of related data blocks (e.g. data blocks of the same file) interrupted by a few unrelated blocks can often be read all together: it is faster to read the whole sequence of blocks and discard the unrelated data blocks than to read several sub-sequences containing only the related blocks. Furthermore, a contiguous group of data blocks may not be stored on the mass storage device in the same order they appear in the file, but they can all be read together efficiently, and pointers or other system data structures adjusted in memory so that the data blocks can be delivered to a client in the correct order. No reallocation or defragmenting may be necessary in these cases.

Block reallocation performed in connection with speculatively-read or pre-fetched data may only optimize a subset of all the blocks in a file or other data object. For example, a simple read predictor that forecasts a read of n successive blocks whenever it notices a client's read of the previous n blocks would never predict a read of the first blocks in a file, so these blocks would never be prefetched and an embodiment of the invention would not normally consider reallocating them. However, an embodiment may consider pre-fetched data blocks and blocks loaded in response to a client's request together, and make reallocation decisions based on a set containing both.

In any case, optimizing access to just portions of a file or other group of data blocks can still provide overall improved performance. In addition, it is appreciated that optimizing excessively long portions of a file may result in diminishing gains compared to the work of optimization. Mass storage device hardware limitations, I/O interface limitations, and cache memory availability may restrict the maximum number of data blocks that can be read at once. Optimizing data files to contain sequential and/or contiguous groups larger than this maximum number may not provide much additional benefit. For example, if the maximum number of blocks that can be read in one operation is 128, then most of the benefit of read reallocation can be realized by coalescing portions of the file into groups of about 128 blocks. A group of 256 blocks would be read as two separate groups of 128, so there may be little point in ensuring that the second set of 128 follows immediately after the first set.

Figure 8:
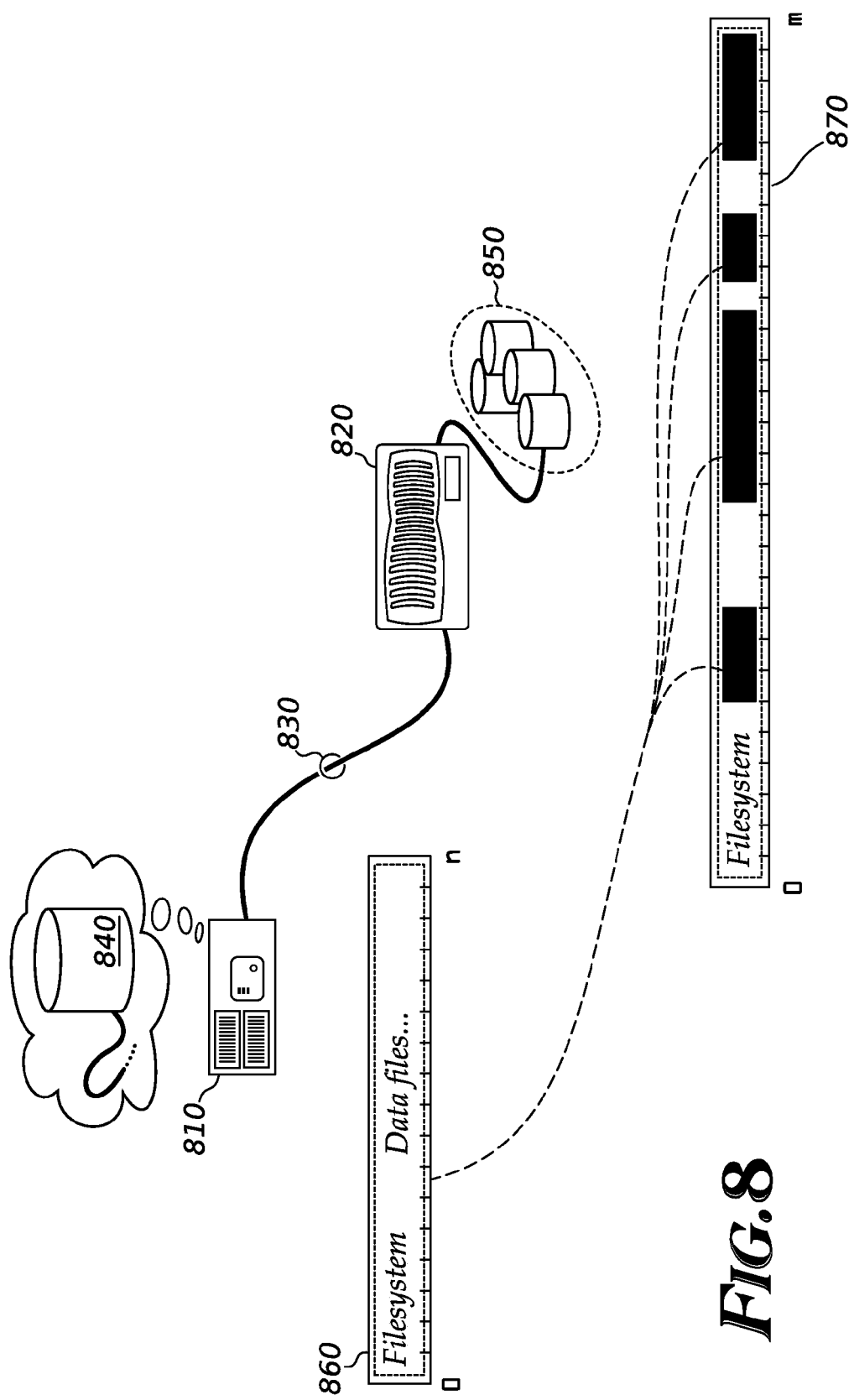
FIG. 8 shows an environment where an embodiment of the invention can accomplish optimizations that cannot be performed by traditional methods.

Referring now to FIG. 8, another embodiment of the invention is described. In this figure, a client 810 communicates with a storage appliance 820 over an interface 830. Interface 830 may be of a type usually associated with a direct connection to a physical mass storage device (i.e. appliance 820 may emulate a mass storage target so that client 810 operates as if it was directly connected to such a device 840). Examples of such interfaces include the Small Computer Systems Interface ("SCSI") and the Fiber Channel ("FC") interface.

Client 810 may create and maintain a filesystem within the array of n blocks of storage 860 that seem to be directly connected. Data files may be created within this filesystem. However, the underlying blocks of data storage are actually provided by an array of mass storage devices 850, which is connected to storage appliance 820. Mass storage devices 850 provide a larger array 870 of m data blocks. Storage appliance 820 may create a second filesystem within array 870, and an ordinary data file within this second filesystem actually contains the data blocks within which client 810 constructs its filesystem. The black rectangles represent portions of this ordinary data file. This arrangement is another example of a container file, but two different systems maintain the two filesystems. Client 810 maintains one filesystem, and storage appliance 820 maintains the other filesystem. Note that the file may be fragmented as it is stored on mass storage devices 850, but client 810 is probably unaware of the fragmentation.

In this environment, it is likely that client 810 cannot determine the physical arrangement of the data blocks of array 860, so any defragmentation client 810 attempts to perform is as likely to reduce performance as to enhance it. On the other hand, storage appliance 820 may be unable to interpret the filesystem that client 810 creates in the data file in array 870. Thus, traditional defragmentation methods cannot be used by appliance 820, either. However, according to an embodiment of the invention, appliance 820 can monitor the operations of client 810 and make predictions about which data blocks will be accessed next. These blocks may be prefetched into cache memory, and the information collected during these speculative reads can be used to select blocks that could beneficially be moved or reallocated.

Figure 9:
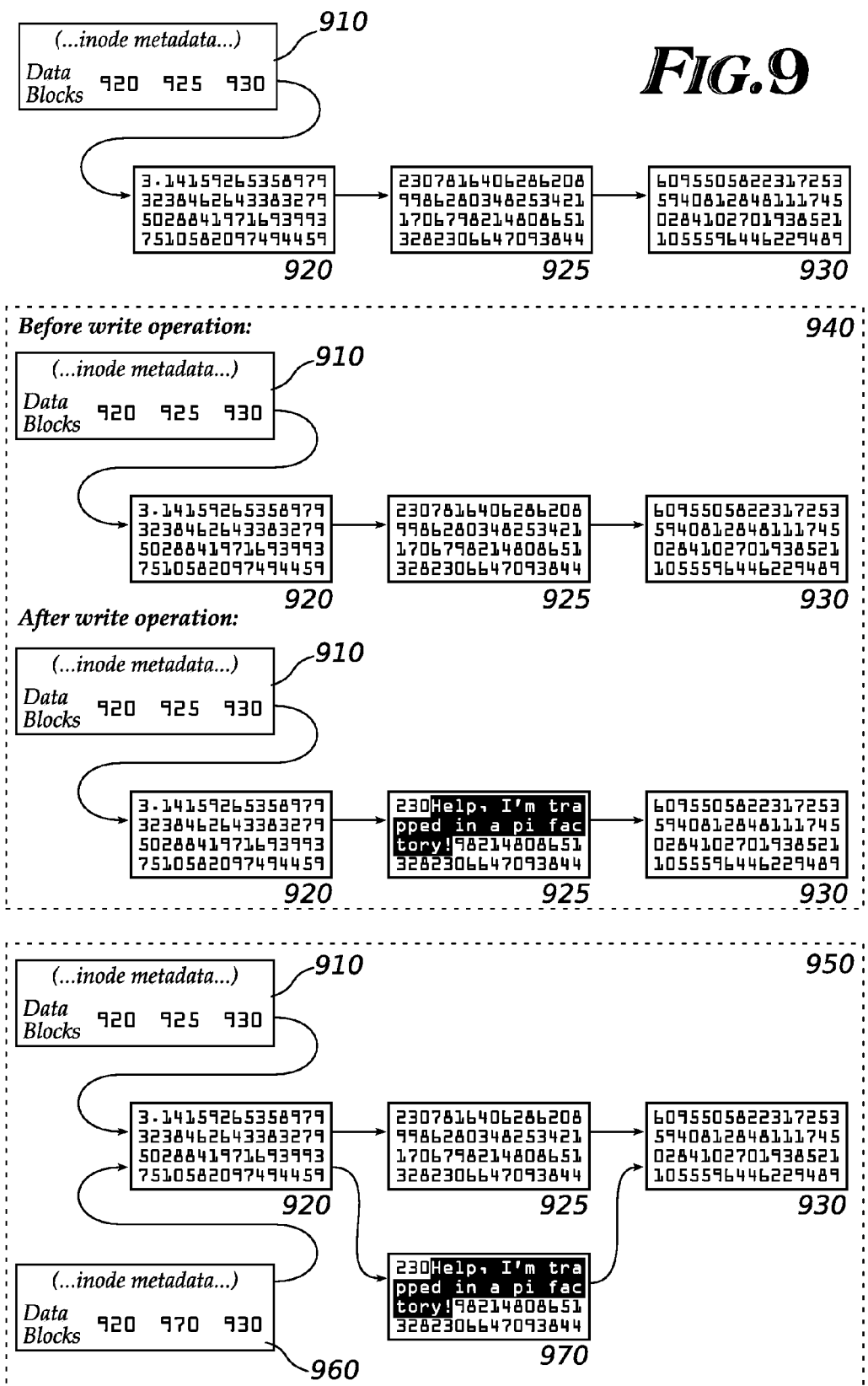
FIG. 9 explains operations of a type of filesystem that can benefit from an embodiment of the invention.

Embodiments of the invention are also useful in another environment. FIG. 9 shows an inode 910 that describes a data file containing three data blocks 920, 925, 930. If a client writes to the data file in a traditional filesystem, the inode and data blocks change as shown within box 940: inode 910 and the sequence of data blocks 920, 925, 930 do not change, but the contents of block 925 are updated (overwritten), as shown by the highlighted text. However, some filesystems operate differently, as shown within box 950. There, a client's write operation does not affect inode 910 or any of the data blocks 920, 925, 930 that are referenced therein. Instead, a new inode 960 is created. Inode 960 references a second sequence of data blocks 920, 970, 930. Block 970 contains a copy of block 925, but the copied data is updated with the new data written by the client. Blocks 920 and 930 are shared between the files described by inodes 910 and 960.

In a system that operates this way, an earlier version of a file may remain available even after a client request changes or deletes the file. The "current" (or most recent) version of the file is indicated by inode 960, while an earlier version is available through inode 910.

With regard to an embodiment of the invention, note that even if blocks 920, 925 and 930 were arranged sequentially and contiguously on a mass storage device, blocks 920, 970 and 930 of the "current" file may not be so arranged. Filesystem management logic that operates this way may frequently create or cause file fragmentation. Also, because blocks 920 and 930 are shared between two files, it may not be easy to decide which sequence (920, 925, 930; or 920, 970, 930) should be reallocated for better access. Because an embodiment of the invention can operate based on pre-fetch predictions that may not be grounded in an analysis of filesystem structures, it can improve data access in a storage server that continues to provide access to older versions of files after the files are modified.

Embodiments of the invention can, of course, operate with data blocks that are pre-fetched because the system recognizes that a file is being read sequentially. However, it is not necessary for the pre-fetch predictions to be based on files or filesystem structures. Pre-fetch decisions can also be made by monitoring clients' block level access, or by analyzing historical data (e.g. a storage server may notice that a certain group of data blocks are often requested after a certain other group, so may prefetch the first group after a request for blocks from the second.

Figures 10A, 10B, 10C:
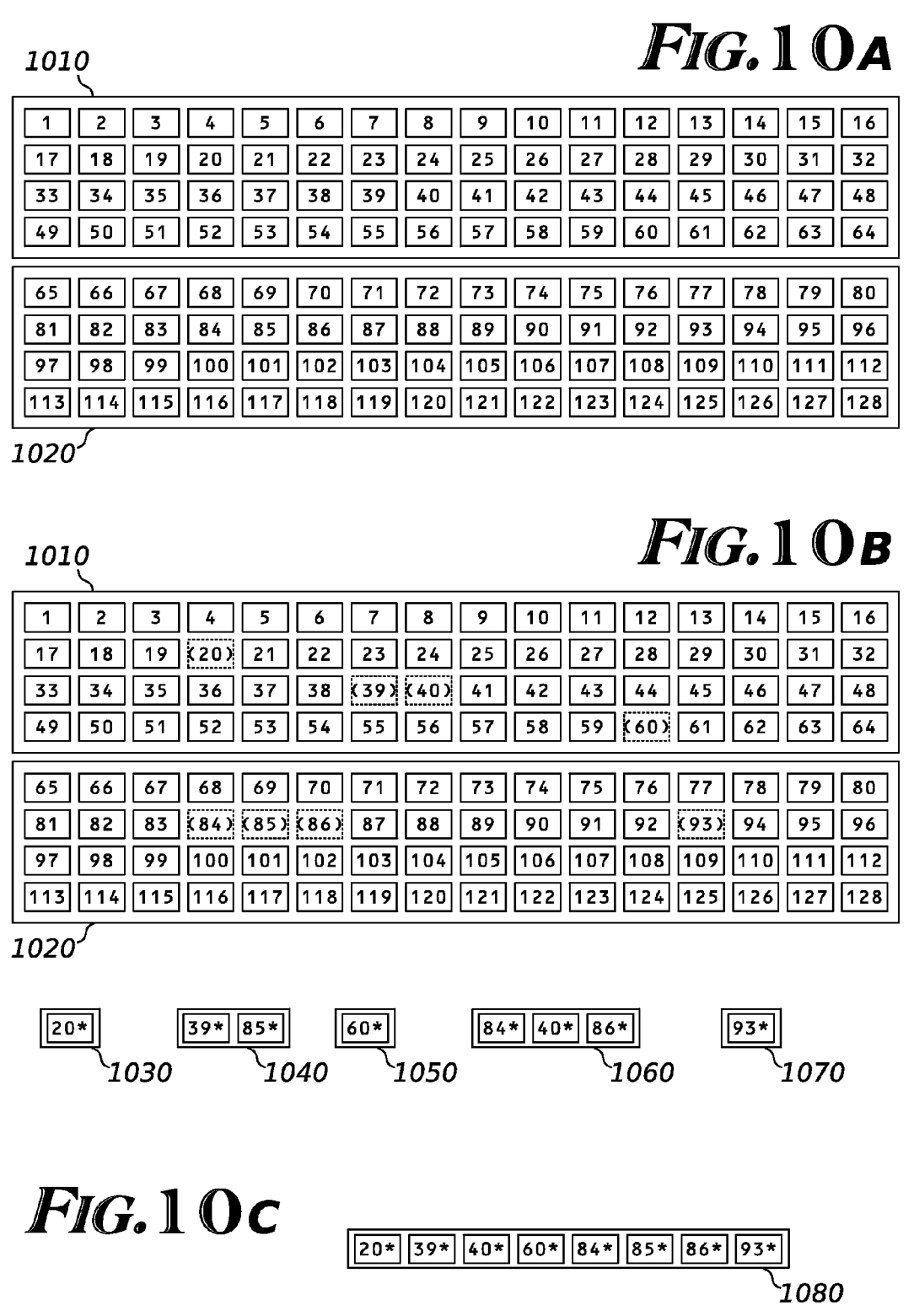

FIGS. 10A-10C present another example to show how an embodiment may determine that a partial reallocation of a range (as opposed to a complete reallocation) may be adequate for protecting storage system performance. Consider an application that writes randomly to eight 4 KB blocks of a file, followed by later large sequential reads of, say, 128, 4 KB blocks. A number of applications might exhibit this behavior, for example, Microsoft® Exchange® or some database workloads such as online transaction processing ("OLTP") followed by database reporting.

Assume that the 128, 4 KB blocks of the data file are initially stored contiguously (all together, without any unrelated blocks interspersed among them) on the mass storage device, as shown in FIG. 10A. (In this figure, the blocks are also stored sequentially, as indicated by the block numbers from 1 to 128, but only contiguity is important.) Assume, furthermore, that the hardware has a read limit of 64, 4 KB blocks (i.e., it can read up to 64 blocks at once).

The application could read all 128 blocks of the file shown in FIG. 10A with two reads: group 1010 containing blocks 1-64, and group 1020 containing blocks 65-128. After updating eight random 4 KB blocks, the file's data may be distributed as shown in FIG. 10B. The update mechanism described with reference to FIG. 9 causes updated data blocks 20, 39, 40, 60, 84, 85, 86 and 93 to be written elsewhere on the disk; the old contents of those data blocks still resides in the original physical blocks. After the updates, the application might have to issue as many as ten read operations to read all 128 blocks, although in FIG. 10B, several of the re-written blocks happen to have been located together in multi-block subsets. According to FIG. 10B, the application would read groups 1010 and 1020, and also blocks at 1030, 1040, 1050, 1060 and 1070 (possibly with seek operations between). An embodiment of the invention, detecting the large sequential reads of all 128 blocks, may detect that fragmentation in blocks 1030, 1040, 1050, 1060 and 1070 impairs the application's access to the file, so it may mark blocks 20, 39, 40, 60, 84, 85, 86 and 93 for reallocation. After reallocation, the blocks may be located contiguously as shown in FIG. 10C. Now, the application can read all 128 blocks in only three read operations (group 1010, group 1020, and group 1080). Note that the blocks in group 1080 are contiguous and in ascending order, but not in sequential order. This is because the application writes that resulted in fragmentation were to random blocks of the file. As mentioned above, contiguity matters, but sequentiality does not. The blocks of group 1010 and 1020 are not completely contiguous: blocks containing old versions of 20, 39, 40, 60, 84-86 and 93 are interspersed among the current versions of blocks 1-128. However, as described above, it is faster to read all 64 blocks of each of group 1010 and 1020, then discard the blocks containing old data; than to read the seven (in this example) contiguous subsets of current blocks, while skipping the blocks that contain old data. (Note that blocks need not be written in either ascending or descending order, though most implementations will do so because this ordering is typically easy to achieve during reallocation.)

Further operations by this application might result in the allocation of other eight-block groups to contain data from blocks in group 1010 or 1020 that are modified. Eventually, group 1010 or 1020 may become so fragmented that it is worthwhile to reallocate the entire group. Thus, generally speaking, an embodiment of the invention may look for small fragmented sections of blocks during read-ahead. If the overall fragmentation of the segment is large (many fragments found and/or fragments are large), reallocate the whole segment. Otherwise, mark only the small, fragmented sections for re-writing.

Figure 11:
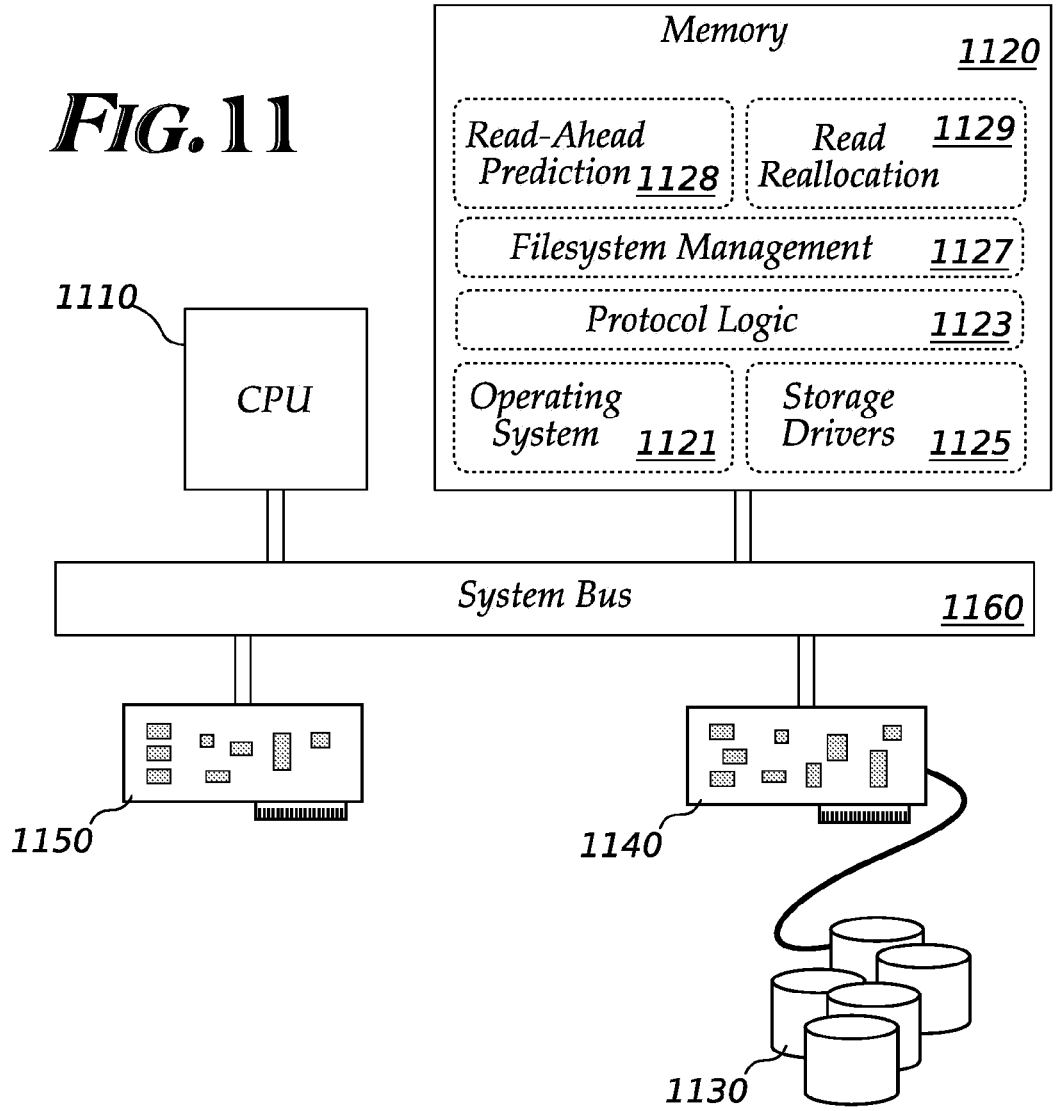
FIG. 11 shows some components and subsystems of a data processing system that contains an embodiment of the invention.

FIG. 11 is a block diagram showing some subsystems and components of a data processing system that implements an embodiment of the invention. Central processing unit ("CPU") 1110 is a programmable processor that executes instructions contained in memory 1120. The instructions ("software") may be grouped into logical functions or modules to perform operations according to an embodiment of the invention. For example, there may be an operating system 1121 to manage the system's hardware resources and coordinate the operation and interactions of other modules; one or more protocol modules 1123 to interact with clients of the data processing system; storage drivers 1125 to read and write data on mass storage devices 1130 via a hardware interface adapter 1140; and filesystem management logic 1127 to administer and allocate the available storage. Read-ahead prediction logic 1128 monitors operations of this system and/or interactions with other client systems to identify data blocks that may be worthwhile to read into memory before there is any actual request or requirement to do so. Reallocation logic 1129 decides whether moving pre-fetched data to different locations on mass storage devices 1130 is likely to provide a benefit. A network adapter 1150 may permit the system to communicate with its peers. The various components mentioned with respect to this figure may be coupled to, and exchange data and control information via, a system bus 1160.

An embodiment of the invention may be a machine-readable medium having stored thereon data and instructions which cause a programmable processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROM), Read-Only Memory (ROM), Random Access Memory (RAM), flash memory, and any of various forms of Erasable Programmable Read-Only Memory (EPROM).

The applications of the present invention have been described largely by reference to specific examples and in terms of particular allocations of functionality to certain hardware and/or software components. However, those of skill in the art will recognize that storage fragmentation detection during read-ahead processing can also be achieved by software and hardware that distribute the functions of embodiments of this invention differently than herein described. Such variations and implementations are understood to be captured according to the following claims.

We claim:

1. A method comprising:
   pre-fetching, by a server, a first plurality of data blocks in response to receiving a client request to access a second plurality of data blocks on a mass storage device coupled to the server, the first plurality of data blocks stored into cache memory of the server and having a plurality of physical volume block numbers (PVBNs), a PVBN being a block number on the mass storage device;
   examining, by the server, the PVBNs for the first plurality of data blocks that is stored in the cache memory to determine whether the first plurality of data blocks are fragmented on the mass storage device; and
   writing, by the server, the first plurality of data blocks to different locations of the mass storage device during the pre-fetching of the first plurality of data blocks, the writing based on a determination that the first plurality of data blocks are fragmented on the mass storage device.

2. The method of claim 1, further comprising:
   monitoring activity of a storage system; and
   predicting the first plurality of data blocks to be pre-fetched based on the activity.

3. The method of claim 1 wherein the first plurality of data blocks is a pre-fetched plurality of data blocks, the method further comprising:
   fetching the requested second plurality of data blocks from the mass storage device in response to the request from a client, and wherein
   said determining comprises determining whether reallocation would improve access to a combined plurality of data blocks including the requested second plurality and the pre-fetched first plurality; and
   said writing comprises writing the combined plurality of data blocks.

4. The method of claim 1 wherein the first plurality of data blocks is a subset of a larger set of related data blocks.

5. The method of claim 1 wherein the first plurality of data blocks contains data from a file.

6. The method of claim 1 wherein the first plurality of data blocks contains a portion of a filesystem.

7. The method of claim 1 wherein a data block of the first plurality of data blocks is part of two different sequences of data blocks.

8. A system comprising:
   a communication interface to receive requests from a client to access first data on a mass storage device coupled to the system;
   a processor to interpret the requests;
   filesystem logic to locate the first data on the mass storage device, wherein the first data is identified by the requests;
   prediction logic to identify additional data on the mass storage device that may soon be requested and to pre-fetch the additional data from the mass storage device, the additional data having a plurality of physical volume block numbers (PVBNs), a PVBN being a block number on the mass storage device;

cache memory to store the additional data that is pre-fetched from the mass storage device; and reallocation logic to examine during the pre-fetch the PVBNs for the additional data that is stored in the cache memory to determine whether the additional data is fragmented on the mass storage device and to write the additional data to different locations on the mass storage device during the pre-fetch of the additional data based on a determination that the additional data is fragmented on the mass storage device.

9. The system of claim 8 wherein the mass storage device is a plurality of storage devices operated as a Redundant Array of Independent Disks ("RAID array").

10. The system of claim 8 wherein the communication interface is a network communication interface.

11. The system of claim 8 wherein the communication interface is a Small Computer Systems Interface ("SCSI").

12. The system of claim 8 wherein the communication interface is a Fiber Channel ("FC") interface.

13. A non-transitory computer-readable medium containing data and instructions to cause a programmable processor to perform operations comprising:

maintaining a filesystem on a mass storage subsystem;

predicting a first plurality of data blocks of the mass storage subsystem that are not required yet but are expected to be required soon in response to receiving a client request to access a second plurality of data blocks on the mass storage device;

pre-fetching the first plurality of data blocks into a cache memory, the first plurality of data blocks having a plurality of physical volume block numbers (PVBNs), a PVBN being a block number on the mass storage device;

examining the PVBNs for the first plurality of data blocks that is pre-fetched into the cache memory to determine whether the first plurality of data blocks are fragmented on the mass storage device; and moving the first plurality of data blocks during the pre-fetching of the first plurality of data blocks based on a determination that the first plurality of data blocks are fragmented on the mass storage device.

14. The non-transitory computer-readable medium of claim 13 wherein maintaining the filesystem comprises:

maintaining an inode to identify a sequence of data blocks that make up a file; and maintaining a block map to distinguish between used data blocks and unused data blocks.

15. The non-transitory computer-readable medium of claim 14 wherein the inode is a first inode and the sequence of data blocks is a first sequence, and wherein maintaining the filesystem comprises:

allocating a second inode to identify a second sequence of data blocks that make up a file, wherein a data block of the first sequence is also in the second sequence.

16. The non-transitory computer-readable medium of claim 13 wherein moving the first plurality of data blocks comprises writing the first plurality of data blocks in sequential order.

17. The non-transitory computer-readable medium of claim 13 wherein moving the first plurality of data blocks comprises writing the first plurality of data blocks contiguously.

18. The non-transitory computer-readable medium of claim 13, containing additional data and instructions to cause the programmable processor to perform operations comprising:

monitoring activity affecting the filesystem, and wherein the predicting operation refers to information collected by the monitoring operation.

19. A method comprising:

performing, by a server, a pre-fetch read of a sequential first set of data blocks from a mass storage device in response to receiving a client request to access a second set of data blocks on the mass storage device, the sequential first set of data blocks stored into cache memory of the server and having a plurality of physical volume block numbers (PVBNs), a PVBN being a block number on the mass storage device;

examining, by the server, during the pre-fetch read, the PVBNs for the sequential first set of data blocks that is stored in the cache memory to detect that at least two subsets of the sequential first set of data blocks that are not contiguous with the sequential first set and not contiguous with each other; and reallocating, by the server, during the pre-fetch read, the at least two subsets to a contiguous area of the mass storage device.

20. The method of claim 18, further comprising:

predicting a client interaction that will require data from the sequential first set of data blocks, wherein the read operation is performed before the client interaction.

21. The method of claim 19 further comprising:

placing data blocks of the at least two subsets in ascending order.

22. The method of claim 19, wherein the at least two subsets are contiguous but not sequential after reallocation.

* * * * *